(12) United States Patent
Heinrich et al.

(10) Patent No.: US 8,087,589 B2
(45) Date of Patent: Jan. 3, 2012

(54) LASER BARCODE SCANNER EMPLOYING HETERODYNING TECHNIQUES

(75) Inventors: Harley Heinrich, Snohomish, WA (US); Jean-Louis Massieu, Montauban (FR)

(73) Assignee: Intermec IP Corp., Everett, WA (US)

( * ) Notice: Subject to any disclaimer, the term of this patent is extended or adjusted under 35 U.S.C. 154(b) by 291 days.

(21) Appl. No.: 12/254,733

(22) Filed: Oct. 20, 2008

(65) Prior Publication Data

US 2009/0114727 A1    May 7, 2009

Related U.S. Application Data

(60) Provisional application No. 60/984,863, filed on Nov. 2, 2007.

(51) Int. Cl.
*G06K 7/10* (2006.01)

(52) U.S. Cl. .............................. 235/462.29; 235/462.26

(58) Field of Classification Search ............. 235/462.29, 235/462.26
See application file for complete search history.

(56) References Cited

U.S. PATENT DOCUMENTS

| | | | |
|---|---|---|---|
| 2,522,267 A | 9/1950 | Hardin | |
| 3,740,141 A | 6/1973 | DeWitt, Jr. | |
| 4,682,015 A * | 7/1987 | Quan | 235/462.27 |
| 5,018,134 A | 5/1991 | Kokubo et al. | |
| 5,118,180 A | 6/1992 | Wichmann et al. | |
| 5,852,286 A * | 12/1998 | Coleman | 235/462.01 |
| 2010/0153062 A1 | 6/2010 | Maltseff | |

OTHER PUBLICATIONS

Bosch et al. "Optical Distance Measurement," Journal of Optics A: Pure and Applied Optics 4, 2002.
Elisei et al. "Implementation of Multiaxial Doppler Sodar System with Advanced Data Processing," Atmospheric Research, 20, 1986, pp. 109-118.
Poujouly et al. "Digital laser range finder: phase-shift estimation by undersampling technique," Industrial Electronics Society, vol. 3, pp. 1312-1317, 1999.
Poujouly et al. "High-Resolution Laser rangefinder based on phase-shift measurement method," Proc. SPIE vol. 3520, pp. 123-132, 1998.
Vaughan et al. "The Theory of Bandpass Sampling," IEE Transaction on Signal Processing., vol. 39, No. 9, Sep. 1991, pp. 1973-1984.

* cited by examiner

*Primary Examiner* — Daniel Hess
*Assistant Examiner* — Rafferty Kelly
(74) *Attorney, Agent, or Firm* — Perkins Coie LLP

(57) ABSTRACT

A system and method of scanning machine-readable symbols with a signal source modulated by a local oscillator to create by heterodyne mixing upconverted signals at the sum and difference frequencies of the local oscillator frequency and the frequency of the time-varying reflectance off the scanned symbols is disclosed. The reflected heterodyned signal is detected by a receiver. Ambient noise is filtered out from the reflected signal, and the received signal at the sum and difference frequencies is processed.

20 Claims, 5 Drawing Sheets

LASER BARCODE SCANNER EMPLOYING HETERODYNING TECHNIQUES

CROSS-REFERENCE TO RELATED APPLICATIONS

This application claims the benefit of U.S. Provisional Application No. 60/984,863, entitled "HETERODYNE LASER BARCODE SCANNER", filed Nov. 2, 2007, and is hereby incorporated by reference.

BACKGROUND

Conventional barcode scanners detect an optical signal that is reflected off of a distant barcode label. Typically, a laser signal source with a constant amplitude is used to scan the barcode, but the received reflected signal varies as a function of time due to the time varying reflectance along the scanning line. Ambient light from external sources having a constant illumination component and time-varying components masks the weakened reflected signal. Although the constant illumination component can generally be filtered out from the reflected signal, time-varying components too close to the reflected signal frequencies can impede decoding of the reflected signal, thus degrading the performance of the scanner.

Historically, barcode scanners have used retrocollection of the return laser signal to optically track the laser spot on the label. Although this improves the performance of the barcode scanner, there is still ambient light present that is reflected to the detector in these kinds of barcode scanners. Further, laser spot tracking uses oscillating optics that may be expensive to design and implement, particularly for high speed scanners.

There is a need for a system that overcomes the above problems, as well as providing additional benefits. Overall, the above examples of some related systems and associated limitations are intended to be illustrative and not exclusive. Other limitations of existing or prior systems will become apparent to those of skill in the art upon reading the following Detailed Description.

DETAILED DESCRIPTION

Described in detail below is a method of multiplying an amplitude-modulated laser signal source with a time-varying barcode reflectance to create by heterodyne mixing upconverted signals at the sum and difference frequencies. The reflected signal at the sum and difference frequencies detected by the receiver do not overlap with the ambient noise spectrum. Thus the reflected signal may be recovered while strongly rejecting the ambient noise. In one example, a heterodyne barcode scanner modulates a laser source at a local oscillator or intermediate frequency. The scanner's receiver detects ambient light as well as the modulated laser signal and filters out the ambient light to measure only the modulated laser signal. The system thus extracts the barcode laser signal from the ambient light.

Various aspects of the invention will now be described. The following description provides specific details for a thorough understanding and enabling description of these examples. One skilled in the art will understand, however, that the invention may be practiced without many of these details. Additionally, some well-known structures or functions may not be shown or described in detail, so as to avoid unnecessarily obscuring the relevant description.

The terminology used in the description presented below is intended to be interpreted in its broadest reasonable manner, even though it is being used in conjunction with a detailed description of certain specific examples of the invention. Certain terms may even be emphasized below; however, any terminology intended to be interpreted in any restricted manner will be overtly and specifically defined as such in this Detailed Description section.

Figure 1:
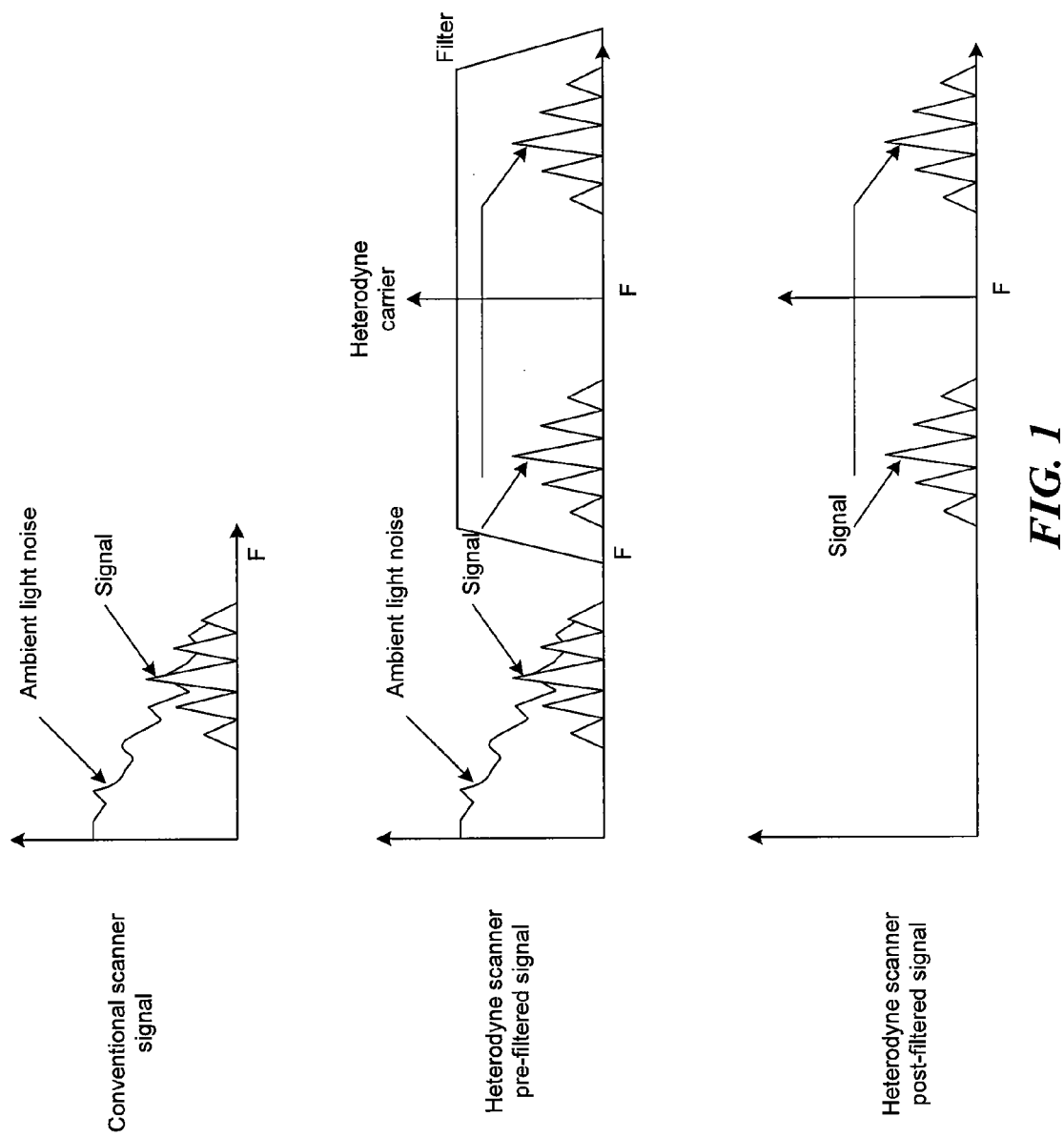
FIG. 1 shows example frequency diagrams of signals detected by a conventional barcode scanner and a heterodyne laser barcode scanner.

The top graph in FIG. 1 shows a typical plot of the frequency content of ambient light in an environment in which a barcode scanner might be used. The ambient light is spread over a wide frequency band, from DC through higher frequencies. The frequency band of the ambient light is so wide that it overlaps the frequencies of the photodiode signal generated when the signal reflected off a barcode label is detected by a conventional barcode scanner. Thus, the receiver in a conventional barcode scanner must somehow distinguish the reflected signal from the ambient noise. Various scanner designs attempt to minimize the effect of the ambient light noise sources by using retrocollective optics or optics that image only that portion of the barcode that is being scanned or optical filters to collect only that portion of the ambient light that are close to the scanner laser wavelength, for example. These approaches, while aiding in the performance of a conventional barcode scanner, require the use of expensive optics.

A heterodyne laser barcode scanner disclosed herein uses an alternative approach which requires less expensive optical components and provides additional benefits. In one example, a local oscillator is used to generate a signal at a particular frequency that is above the highest frequency of the ambient light. The spectrum of the ambient light may be quite wide, but typically the strength of the ambient light will not interfere with detection of the desired barcode signal when the ambient light illumination falls below a certain amplitude level, and the certain amplitude level may be predetermined such that the signal to noise ratio of the received barcode signal is sufficiently high even in the presence of the ambient light. The local oscillator frequency should be chosen to be higher than the frequency at which this occurs in the ambient light. The separation between the local oscillator frequency and the ambient light spectrum may be made as wide as desired.

The local oscillator frequency amplitude modulates the signal source used to scan the barcode. Scanning a barcode with the modulated laser beam results in a heterodyning effect in which the reflected signal is the product of the amplitude-modulated laser with the time-varying reflectance of the barcode signal along the scanning line arising from the contrast of the printed barcode such that sum and difference signals or beat frequencies of the local oscillator and the barcode signal are generated. The combination or product of the two inputs results in an output that may have components at four different frequencies, the two original frequencies, the sum of the input frequencies, and the difference between the input frequencies. When the local oscillator frequency is chosen appropriately, the sum and difference frequencies, which are centered around the local oscillator frequency, are well above the frequency band of the ambient light. Because only the laser spot is multiplied by the locally varying reflectance of the laser scanning along the barcode, only the signal encoding the barcode is upconverted to higher frequencies. In contrast, the ambient noise is multiplied by the average value of the reflectance integrated over the solid angle of acceptance of the receiving optic (either tracking or not tracking the laser spot) which encompasses several bars and spaces of the barcode. Thus, the average reflectance tends to a DC value, and the heterodyning effect over the ambient noise is negligible.

The middle graph in FIG. 1 shows a plot of the frequency content of the signal which a heterodyne barcode scanner would detect. While the ambient light is still present, the signal source reflected off the barcode is present at the original signal source frequency as well as at two higher frequency bands centered around the local oscillator frequency. The local oscillator frequency may also be referred to as the heterodyne carrier. The local frequency may be chosen as an intermediate frequency with respect to the expected frequencies: the barcode signal and the conventional frequencies. The shifted signal frequency bands are above and do not overlap with the ambient light or other illumination noise, and thus there is no problem in distinguishing the reflected signal from the ambient light. There are no amplitude markings on the graphs to indicate the strength of the reflected signal at the original frequency and the shifted frequencies because the relative amplitudes of the reflected signals at the different frequencies may vary depending upon the efficiency with which the heterodyning effect is implemented.

Also shown in the middle graph of FIG. 1 is an example of a frequency response of a frequency filter that could be used to attenuate the unwanted ambient light spectrum. Although the frequency filter will not eliminate the ambient noise entirely, it may attenuate the ambient light spectrum significantly, by up to a factor of 100 to 1000 times or more. The filter may be centered around the heterodyne carrier frequency and be narrow enough to allow the signal to be transmitted while filtering out the ambient light spectrum. Alternatively, a high-pass filter may be used to attenuate just the low frequencies such as the ambient light spectrum and allow the higher frequency signals to pass through.

The frequency filter could be implemented in the electronic domain, either with an analog or a digital filter, after the reflected light has been detected by a receiver circuit. Examples of electronic filters include, but are not limited to, surface acoustic wave (SAW) filters which are implemented with a piezoelectric crystal, a resonant RLC circuit, and a digital filter where the signal is passed through an analog to digital converter and then a digital signal processor and/or digital filters.

Alternatively, the frequency filter could be implemented in the optical domain, before the reflected light signal is received by a detector in the receiver circuit. Examples of optical frequency filters include, but are not limited to, thin-film coating filters and Fabry-Perot tunable filters. It will be apparent to a person skilled in the art that many other types of frequency filters, electrical, optical, or otherwise, may be used to effectively attenuate the ambient light spectrum. In theory, the filter could remove all ambient light or other noise; however, even in practice with inexpensive components, the system can attenuate the signal by substantially (e.g. 100 dB or more), with some small portion of the ambient light noise signal remaining. Thus, the intermediate frequency of the local oscillator may be selected to be above a threshold or cut off level of the expected ambient noise.

The bottom graph in FIG. 1 shows a plot of the frequency content of the reflected signal from a heterodyne barcode scanner after the frequency filter has been applied. The ambient light noise and the original reflected signal which overlapped with the ambient light noise have been filtered to a sufficiently low level which will not interfere with the detection of the frequency-shifted reflected barcode signal.

Figure 2:
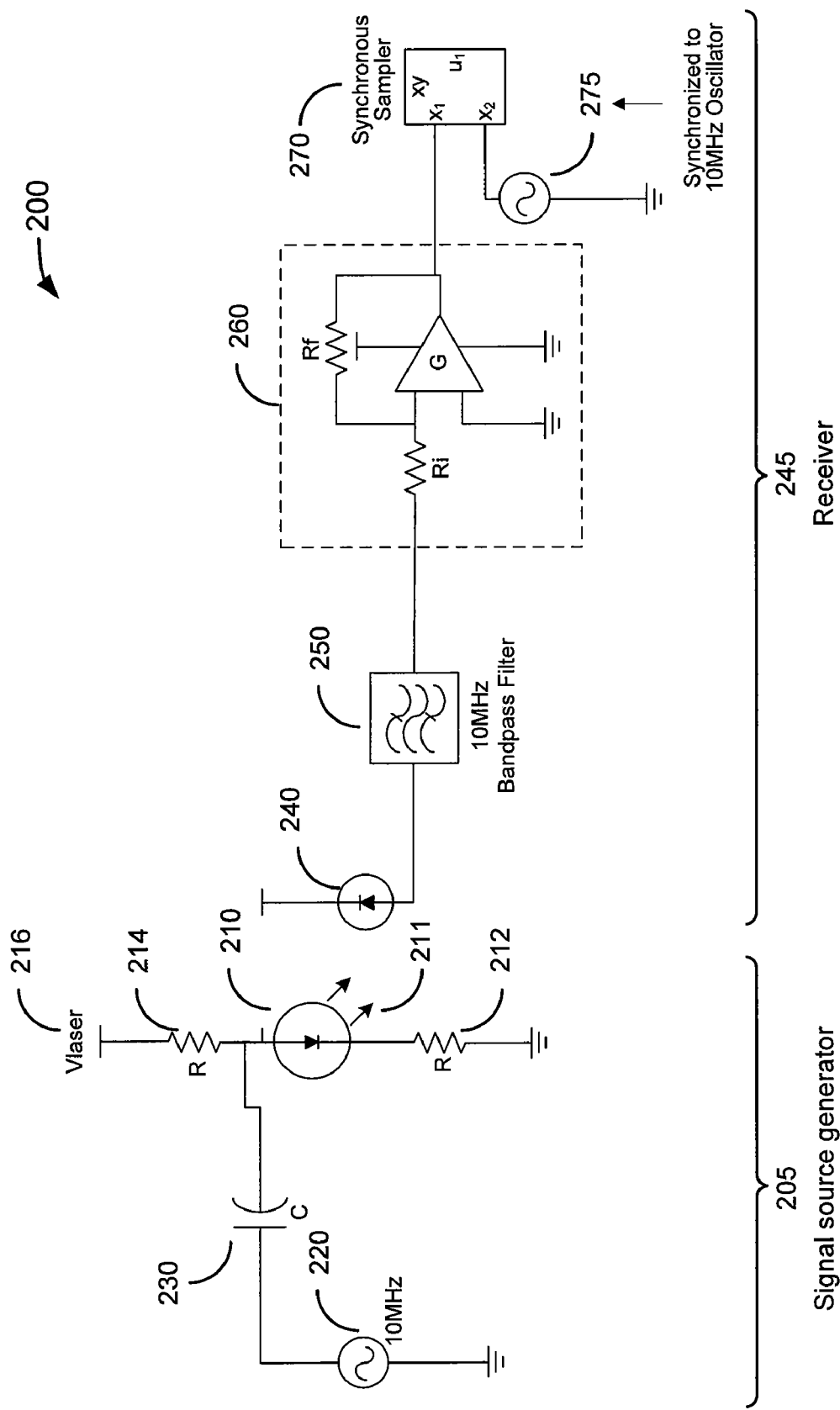
FIG. 2 is a circuit diagram showing an example of a heterodyne barcode scanner design circuitry.

FIG. 2 shows an example 200 of an implementation of a heterodyne barcode scanner. The heterodyne barcode scanner includes two sections, the signal source generator 205 and the receiver 245.

In the signal source generator 205, a laser diode 210 is used to generate the signal source 211 for scanning barcodes. The figure shows the laser diode 210 biased at 50% of its driving voltage 216, Vlaser, through the use of two resistors 212 and 214 which have the same resistance value, R. Other biasing points may also be implemented with the use of resistors having appropriate values. In one embodiment, the signal source generator 205 may be a narrowband source.

A local oscillator frequency source 220 is chosen to have an intermediate frequency to that of the laser signal, which in this example is 10 MHz. The local oscillator 220 is placed in series with a capacitor 230 in order to capacitively couple the local oscillator 220 to the laser diode 210 and modulate its output over the range from 0 to 100%.

On the receiver side 245, a photodiode 240 functions as a photodetector, which detects a reflected light signal 211 after it has been reflected from the barcode. (The reflected light signal is of course modulated with information from the barcode.) The light falling on the photodiode 240 generates a current, and the current is filtered by a bandpass filter 250 centered around the frequency of the local oscillator 220. If the bandpass filter is wide enough to pass the reflected barcode signal and yet still attenuate the ambient light, the bandpass filter need not be exactly centered around the frequency of the local oscillator.

The filtered signal is then amplified by a signal amplifier 260. Such a signal amplifier may be, by way of example but not limitation, an operational amplifier in a simple inverting amplifier configuration as depicted within the box 260. The filtered and amplified signal is then sent through an analog to digital (A to D) converter. The analog to digital converter may be, by way of example but not limitation, implemented with a synchronous sampler 270 which is synchronized to the frequency of the local oscillator 220, 10 MHz.

Figure 5:
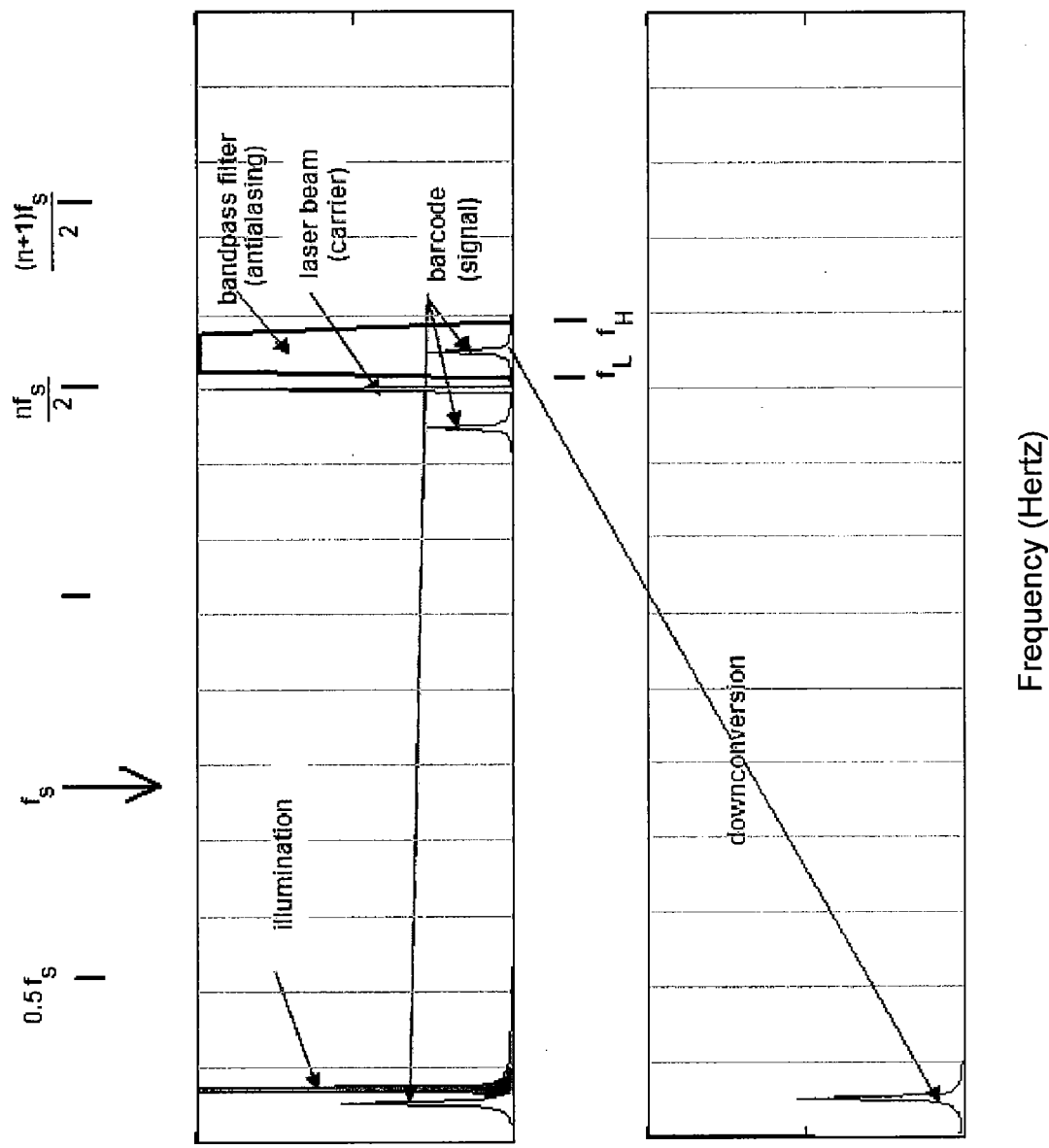
FIG. 5 shows example frequency diagrams of signals detected by a heterodyne laser barcode scanner and sampling frequency requirements for recovering the laser barcode signal.

In one embodiment, the signal can be undersampled with a low speed A to D converter. By dividing the clock for the local oscillator frequency source 220 with a digital n-counter, an undersampling clock synchronous with the heterodyne carrier is obtained that helps to minimize jitter and phase errors during demodulation. In the top graph of FIG. 5, the spectrum of the signal to be downconverted is delimited by the frequencies $f_L$ and $f_H$. The sampling frequency $f_s$ should be chosen such that $f_s \geq 2(f_H - f_L)$ (Nyquist criterion), $$\frac{nf_s}{2} < f_L, \text{ and } \frac{(n+1)f_s}{2} > f_H$$

(in order to avoid folding the signal spectrum on itself). These conditions can be expressed as:

$$\frac{2f_H}{n+1} < f_s < \frac{2f_L}{n},$$

where n is an integer such that $$n < \frac{f_L}{f_H - f_L}.$$

Practicaly, the frequency $f_S$ is chosen such that $nf_S$ is as close as possible to the frequency $f_L$, where n is an even integer so as to prevent reversal of the aliased spectrum. Once the signal is downconverted (as shown in the bottom graph of FIG. 5), a digital low-pass filter is applied to retain only the original baseband signal, and the digital filtering provides high order low-pass filtering, thus helping to improve the signal gain process. Band pass (or high pass) filtering, followed by low pass filtering may be employed, which can filter out light illumination noise as well as avoid aliasing.

Alternatively, the filtered and amplified signal may be sent through a mixer at 10 MHz or a diode rectifier before being passed through a traditional analog to digital converter. The resulting signal will have the ambient light noise attenuated by the out-of-band rejection characteristics of the bandpass filter.

In another embodiment, the signal from the photodiode 240 may simply be amplified by the photodiode preamplifier 260, converted to a digital signal by an analog-digital converter 270 and 275, and then filtered by a digital signal processor.

Figure 3:
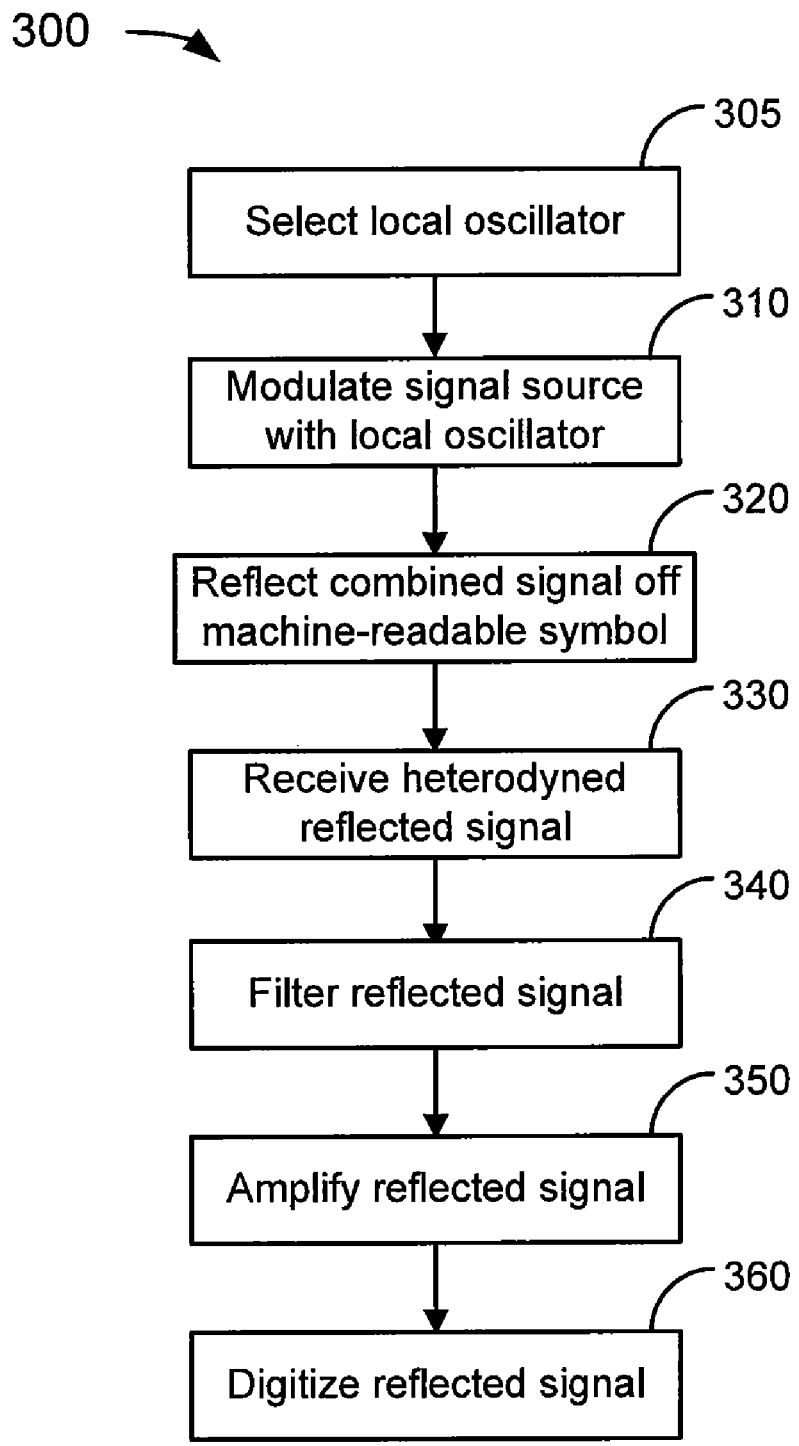
FIG. 3 depicts a flow diagram illustrating a suitable process for heterodyning a laser signal source with a signal generated by a local oscillator to improve signal quality.

FIG. 3 depicts a flow diagram 300 illustrating a suitable process for heterodyning a narrowband signal source with a signal generated by a local oscillator to improve signal quality.

At block 305, a local oscillator is selected or tuned to produce a signal at a suitable local oscillator frequency. Suitable local oscillator frequencies may be selected, tuned or adjusted to be greater than the highest ambient noise frequency plus the lowest frequency produced by the signal source. Alternatively, if the amplitude of the ambient noise spectrum decreases toward the high end of the spectrum such that the signal to noise ratio is not significantly degraded, a suitable local oscillator frequency may be selected such that the sum of the local oscillator frequency plus the signal source frequencies overlaps the ambient noise spectrum for low amplitude ambient noise. Other configurations are of course possible.

At block 310, the narrowband signal source is modulated with the local oscillator signal. Components for mixing the two signals include, but are not limited to, a nonlinear circuit, a diode, a transistor, and a multiplier chip. The modulated signal is aimed using focusing optics at the machine-readable symbols, and a portion of the heterodyned reflected signal is collected using collection optics at step 320. In one configuration, the focusing optics and collection optics may be the same set of optics.

Next, at block 330, the reflected signal is received by a receiver. Non-limiting examples of a receiver include a photodetector and a charge-coupled device. At block 340, the reflected signal may be optically filtered to attenuate unwanted ambient noise frequencies in the optical domain prior to when the reflected signal is received by the receiver. Alternatively, the reflected signal may be filtered in the electrical domain after the receiver receives the signal.

The signal received by the receiver is amplified at block 350. A non-limiting example of an amplifier that may be used includes an operational amplifier in a simple inverting amplifier configuration. At block 360, the amplified signal is converted from an analog signal to a digital signal, using a synchronous sampler, for example.

Alternatively, the received signal may be received at block 330, amplified, converted to a digital signal, and then filtered by a digital signal processor. Other implementations are of course possible.

Figure 4:
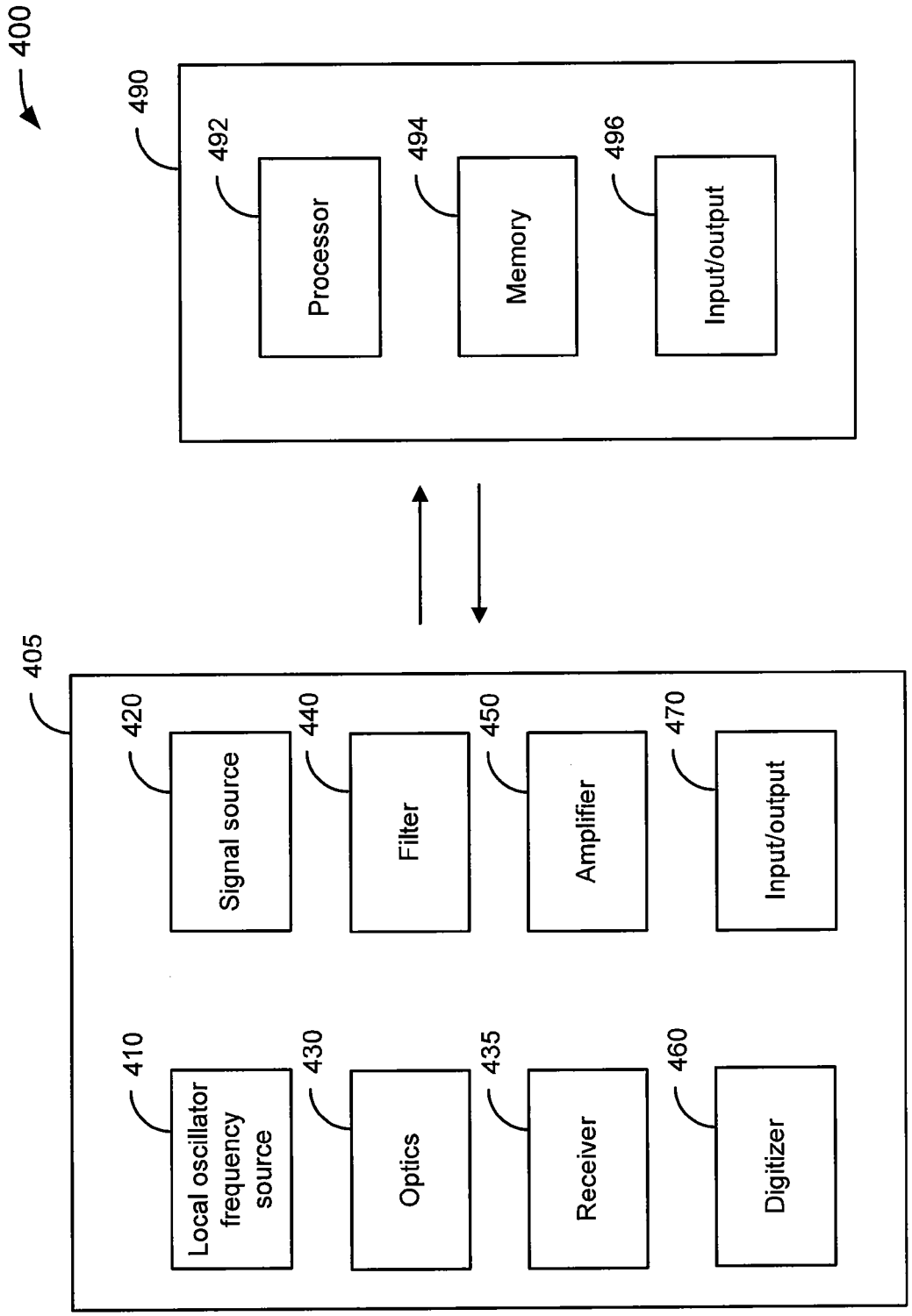
FIG. 4 shows an example block diagram of a system including a heterodyne laser scanner used to read barcodes and a barcode processor.

FIG. 4 shows an example block diagram 400 of a system including a heterodyne scanner 405 used to read barcodes and a barcode processor 490. A heterodyne laser scanner 405 may include at least one local oscillator frequency source 410, signal source 420, optics 430, receiver 435, one or more filters 440, one or more amplifiers 450, digitizer 460, and input/output devices 470.

The heterodyne laser scanner 405 includes the local oscillator frequency source 410, as described above. The signal source 420 is used to produce a signal at a particular set of frequencies. The signal source 420 may be a laser or any narrowband signal generator. Any of various tunable or adjustable frequency and/or signal sources may be employed.

The optics 430 scan the modulated laser signal across the barcode or other machine-readable symbols. Further, the optics 430 may include focusing optics for focusing the modulated laser signal and collection optics for collecting the reflected signal from the barcode or other machine-readable symbols. The filter 440 may be an optical filter, an electrical filter, or both. An optical filter would be used prior to receiving the reflected signal with the receiver 435. An electrical filter would be used after the receiver 435 has received the reflected signal.

The receiver 435 converts the reflected signal from the optical domain to the electrical domain. Then one or more amplifiers may be used to amplify the electrical signal generated by the receiver 435. An analog to digital converter or digitizer 460 is used to produce a digitized form of the electrical signal.

An input/output device 470 may include, but is not limited to, triggers to start and stop the heterodyne scanner or to initiate other scanner functions, visual displays, speakers, and communication devices such as receivers and/or transmitters that operate through wired or wireless communications.

A barcode processor 490 may include one or more processors 492, memory 494, input/output devices 496. The one or more processors 492 may be a microprocessor or any other type of processor used to run barcode reader applications to decode the barcode or other machine-readable symbols. Memory 494 may include but is not limited to, RAM, ROM, and any combination of volatile and non-volatile memory. An input/output device 496 may include, but is not limited to, visual displays, speakers, and communication devices such as receivers and/or transmitter that operate through wired or wireless communications.

In one configuration, the barcode signal is transmitted (wired or wirelessly) from the heterodyne scanner 405 to the barcode processor 490 after the signal has been digitized. Alternatively, the barcode processor functions may be performed within the heterodyne scanner 405 and transmission of the digitized signal is not necessary. Overall, the system 400 of FIG. 4 may take many forms, only one example of which is shown and described herein.

The words "herein," "above," "below," and words of similar import, when used in this application, shall refer to this application as a whole and not to any particular portions of this application. Where the context permits, words in the above Detailed Description using the singular or plural number may also include the plural or singular number respectively. The word "or," in reference to a list of two or more items, covers all of the following interpretations of the word: any of the items in the list, all of the items in the list, and any combination of the items in the list.

The above detailed description of embodiments of the invention is not intended to be exhaustive or to limit the invention to the precise form disclosed above. While specific embodiments of, and examples for, the invention are described above for illustrative purposes, various equivalent modifications are possible within the scope of the invention, as those skilled in the relevant art will recognize. For example, while a bar code scanner for reading bar codes are mentioned, any reading apparatus for reading machine-readable symbols may be used under the principles disclosed herein. Further any specific numbers noted herein are only examples: alternative implementations may employ differing values or ranges.

The teachings of the invention provided herein can be applied to other systems, not necessarily the system described above. The elements and acts of the various embodiments described above can be combined to provide further embodiments.

While the above description describes certain embodiments of the invention, and describes the best mode contemplated, no matter how detailed the above appears in text, the invention can be practiced in many ways. Details of the system may vary considerably in its implementation details, while still being encompassed by the invention disclosed herein. As noted above, particular terminology used when describing certain features or aspects of the invention should not be taken to imply that the terminology is being redefined herein to be restricted to any specific characteristics, features, or aspects of the invention with which that terminology is associated. In general, the terms used in the following claims should not be construed to limit the invention to the specific embodiments disclosed in the specification, unless the above Detailed Description section explicitly defines such terms. Accordingly, the actual scope of the invention encompasses not only the disclosed embodiments, but also all equivalent ways of practicing or implementing the invention under the claims.

We claim:

1. A method of reading a barcode, comprising:
   providing a local oscillator frequency source that generates a local oscillator signal at a local oscillator frequency, wherein the local oscillator frequency is an intermediate frequency selected to be above a frequency threshold of expected ambient light noise;
   providing a laser source that generates a laser output signal having a set of laser frequencies;
   combining the local oscillator signal with the laser output signal to produce at least one combined signal;
   directing the combined signal to be scanned over and reflected off the barcode;
   receiving a reflected signal from the barcode, wherein the reflected signal includes at least a first component at a first set of frequencies that is a sum of the local oscillator frequency and a barcode signal frequency, and a second component at a second set of frequencies that is a difference between the local oscillator frequency and the barcode signal frequency;
   filtering the reflected signal with a bandpass filter to attenuate unwanted frequencies;
   amplifying the filtered signal;
   digitizing the filtered signal to produce a digitized signal;
   processing the digitized signal to produce a processed signal, wherein the processed signal is a reading of the barcode; and
   storing the processed signal in a tangible computer readable medium.

2. The method of claim 1 wherein filtering the reflected signal comprises optically or electrically filtering the reflected signal.

3. The method of claim 1 wherein the combining comprises modulating the laser output signal with the local oscillator signal.

4. The method of claim 1 further comprising wirelessly transmitting the digitized signal to a barcode processor for processing the filtered signal.

5. The method of claim 1 wherein digitizing the filtered signal comprises undersampling a clock for the local oscillator frequency source with a digital n-counter, at a sampling frequency $f_s$, wherein the sampling frequency $f_s$ satisfies a condition $$\frac{2f_H}{n+1} < f_s < \frac{2f_L}{n},$$

and further wherein $f_L$ is a lower frequency limit of a frequency band of the reflected signal, $f_H$ is an upper frequency limit of the frequency band of the reflected signal, and n is an integer less than $$\frac{f_L}{f_H - f_L}.$$

6. The method of claim 5, wherein the frequency band of the reflected signal is the first set of frequencies or the second set of frequencies.

7. The method of claim 5, wherein n is an even integer.

8. The method of claim 1 wherein the local oscillator frequency source is a narrowband frequency source, and wherein the bandpass filter is approximately centered at the local oscillator frequency.

9. The method of claim 1 wherein a synchronous analog to digital converter is used for digitizing the filtered signal.

10. A tangible computer-readable medium storing processing instructions for implementing an operation performed by a computer, the operation comprising:
   scanning at least one combined signal over a barcode to be reflected from the barcode, wherein
      a local oscillator frequency source generates a local oscillator signal at a local oscillator frequency, wherein the local oscillator frequency is an intermediate frequency selected to be above a frequency threshold of expected ambient light noise;
      a laser source generates a laser output signal having a set of laser frequencies;
      the local oscillator signal is combined with the laser output signal to produce the at least one combined signal;
   receiving a reflected signal from the barcode, wherein the reflected signal includes at least a first component at a first set of frequencies that is a sum of the local oscillator frequency and a barcode signal frequency, and a second component at a second set of frequencies that is a difference between the local oscillator frequency and the barcode signal frequency;

filtering the reflected signal with a bandpass filter to attenuate unwanted frequencies;

amplifying the filtered signal;

digitizing the filtered signal to produce a digitized signal;

processing the digitized signal to produce a processed signal, wherein the processed signal is a reading of the barcode; and storing the processed signal in a tangible computer readable medium.

11. The tangible computer-readable medium of claim 10, wherein combining comprises modulating the laser output signal with the local oscillator signal.

12. The tangible computer-readable medium of claim 10, the operation further comprising wirelessly transmitting the digitized signal to a barcode processor for processing the filtered signal.

13. The tangible computer-readable medium of claim 10, wherein digitizing the filtered signal comprises undersampling a clock for the local oscillator frequency source with a digital n-counter, at a sampling frequency $f_s$, wherein the sampling frequency $f_s$ satisfies a condition $$\frac{2f_H}{n+1} < f_s < \frac{2f_L}{n},$$

and further wherein $f_L$ is a lower frequency limit of a frequency band of the reflected signal, $f_H$ is an upper frequency limit of the frequency band of the reflected signal, and n is an integer less than $$\frac{f_L}{f_H - f_L}.$$

14. The tangible computer-readable medium of claim 13, wherein the frequency band of the reflected signal is the first set of frequencies or the second set of frequencies.

15. The tangible computer-readable medium of claim 13, wherein n is an even integer.

16. An apparatus for reading a barcode, comprising:

means for generating a local oscillator signal at a local oscillator frequency, wherein the local oscillator frequency is an intermediate frequency selected to be above a frequency threshold of expected ambient light noise;

means for generating a laser output signal having a set of laser frequencies;

means for combining the local oscillator signal with the laser output signal to produce at least one combined signal;

means for receiving a reflected signal from the barcode, wherein the combined signal is scanned over and reflected off the barcode, and further wherein the reflected signal includes at least a first component at a first set of frequencies that is a sum of the local oscillator frequency and a barcode signal frequency, and a second component at a second set of frequencies that is a difference between the local oscillator frequency and the barcode signal frequency;

means for bandpass filtering the reflected signal to attenuate unwanted frequencies;

means for amplifying the filtered signal;

means for digitizing the filtered signal to produce a digitized signal; and means for processing the digitized signal to produce a processed signal, wherein the processed signal is a reading of the barcode, wherein the processed signal is stored in a tangible computer readable medium.

17. The apparatus of claim 16, wherein the means for combining modulates the laser output signal with the local oscillator signal.

18. The apparatus of claim 16, wherein the means for digitizing the filtered signal undersamples a clock for the local oscillator frequency source with a digital n-counter, at a sampling frequency $f_s$, wherein the sampling frequency $f_s$ satisfies a condition $$\frac{2f_H}{n+1} < f_s < \frac{2f_L}{n},$$

and further wherein $f_L$ is a lower frequency limit of a frequency band of the reflected signal, $f_H$ is an upper frequency limit of the frequency band of the reflected signal, and n is an integer less than $$\frac{f_L}{f_H - f_L}.$$

19. The apparatus of claim 18, wherein the frequency band of the reflected signal is the first set of frequencies or the second set of frequencies.

20. The apparatus of claim 18, wherein n is an even integer.

* * * * *